(12) United States Patent
Watson et al.

(10) Patent No.: US 10,550,694 B2
(45) Date of Patent: Feb. 4, 2020

(54) CONVEYOR SYSTEM FOR MINING EQUIPMENT

(71) Applicant: Joy Global Underground Mining LLC, Warrendale, PA (US)

(72) Inventors: Charles W. Watson, Paris, KY (US); Michael Nolan, Lexington, KY (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/977,495

(22) Filed: May 11, 2018

(65) Prior Publication Data
US 2018/0347359 A1   Dec. 6, 2018

Related U.S. Application Data

(60) Provisional application No. 62/513,006, filed on May 31, 2017.

(51) Int. Cl.
| | | |
|---|---|---|
| *E21F 13/02* | (2006.01) | |
| *E21F 13/00* | (2006.01) | |
| *B65G 41/00* | (2006.01) | |
| *E21F 13/08* | (2006.01) | |

(52) U.S. Cl.
CPC ............ *E21F 13/02* (2013.01); *B65G 41/002* (2013.01); *B65G 41/008* (2013.01); *E21F 13/002* (2013.01); *E21F 13/086* (2013.01)

(58) Field of Classification Search
CPC ................ B65G 41/002; B65G 41/008; B65G 2201/045; B65G 2812/02029; E21F 13/002; E21F 13/02; E21F 13/08; E21F 13/086

USPC .................................................. 198/302, 314
See application file for complete search history.

(56) References Cited

U.S. PATENT DOCUMENTS

| | | | | |
|---|---|---|---|---|
| 2,546,262 | A * | 3/1951 | Hatcher ................. | B65G 19/10 198/731 |
| 3,361,248 | A * | 1/1968 | Daymon ................ | A01D 87/02 198/303 |
| 3,887,061 | A * | 6/1975 | Hopkins ................ | B65G 65/28 198/304 |
| 4,694,948 | A * | 9/1987 | Ceylan ................. | B65G 41/002 198/311 |
| 5,634,545 | A * | 6/1997 | Plumley ................ | B65G 37/00 198/303 |
| 7,284,650 | B2 * | 10/2007 | Hoffmann ............ | B65G 41/008 198/303 |
| 7,555,799 | B2 * | 7/2009 | Petermann ........... | B65G 41/008 14/2.4 |
| 7,814,599 | B2 * | 10/2010 | Brewka ................. | B65G 65/28 14/2.4 |

(Continued)

FOREIGN PATENT DOCUMENTS

DE          3611061 A1 * 10/1987   ............ B65G 41/008

*Primary Examiner* — Gene O Crawford
*Assistant Examiner* — Keith R Campbell
(74) *Attorney, Agent, or Firm* — Michael Best & Friedrich LLP

(57) ABSTRACT

A conveyor system includes a plurality of crawler members, a frame supported via the crawler members, a skid pad moveable relative to the frame to raise and lower the frame relative to a ground surface, and an intake structure supported by the frame. The intake structure includes a first conveyor. The conveyor system further includes a discharge boom supported by the frame. The discharge boom includes a second conveyor.

19 Claims, 3 Drawing Sheets

(56) References Cited

U.S. PATENT DOCUMENTS

| | | | | |
|---|---|---|---|---|
| 8,584,826 B2* | 11/2013 | Smith | ................. | B65G 41/008 |
| | | | | 198/302 |
| 8,739,956 B2* | 6/2014 | Smith | ................. | B65G 41/008 |
| | | | | 180/6.48 |
| 8,985,302 B2* | 3/2015 | Hubrich | ................ | B65G 65/28 |
| | | | | 198/314 |

* cited by examiner

CONVEYOR SYSTEM FOR MINING EQUIPMENT

CROSS-REFERENCE TO RELATED APPLICATIONS

This application claims priority to U.S. Provisional Application No. 62/513,006, filed May 31, 2017, the entire contents of which are incorporated herein by reference.

BACKGROUND OF THE INVENTION

The present invention relates to mining equipment, in particular to a conveyor system.

Conveyor assemblies are generally used in mining applications to facilitate the movement of a mined material. Mined material is loaded onto an intake end of the conveyor system and conveyed to a discharge end of the conveyor system.

SUMMARY

In accordance with one construction, a conveyor system includes a plurality of crawler members, a frame supported by the crawler members, a skid pad moveable relative to the frame to raise and lower the frame relative to a ground surface, and an intake structure supported by the frame. The intake structure includes a first conveyor. The conveyor system further includes a discharge boom supported by the frame. The discharge boom includes a second conveyor.

In accordance with another construction, a conveyor system includes a plurality of crawler members, a frame supported by the crawler members, and an intake structure supported by the frame. The intake structure includes a first conveyor. The conveyor system further includes a discharge boom supported by the frame. The discharge boom includes a second conveyor. The plurality of crawler members are each rotatable relative to the frame Other aspects of the invention will become apparent by consideration of the detailed description and accompanying drawings.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. It should be understood that the description of specific constructions is not intended to limit the disclosure from covering all modifications, equivalents, and alternatives falling within the spirit and scope of the disclosure. Also, it is to be understood that the phraseology used herein for the purpose of description and should not be regarded as limiting.

DETAILED DESCRIPTION

Figures 1, 1A, 1B:
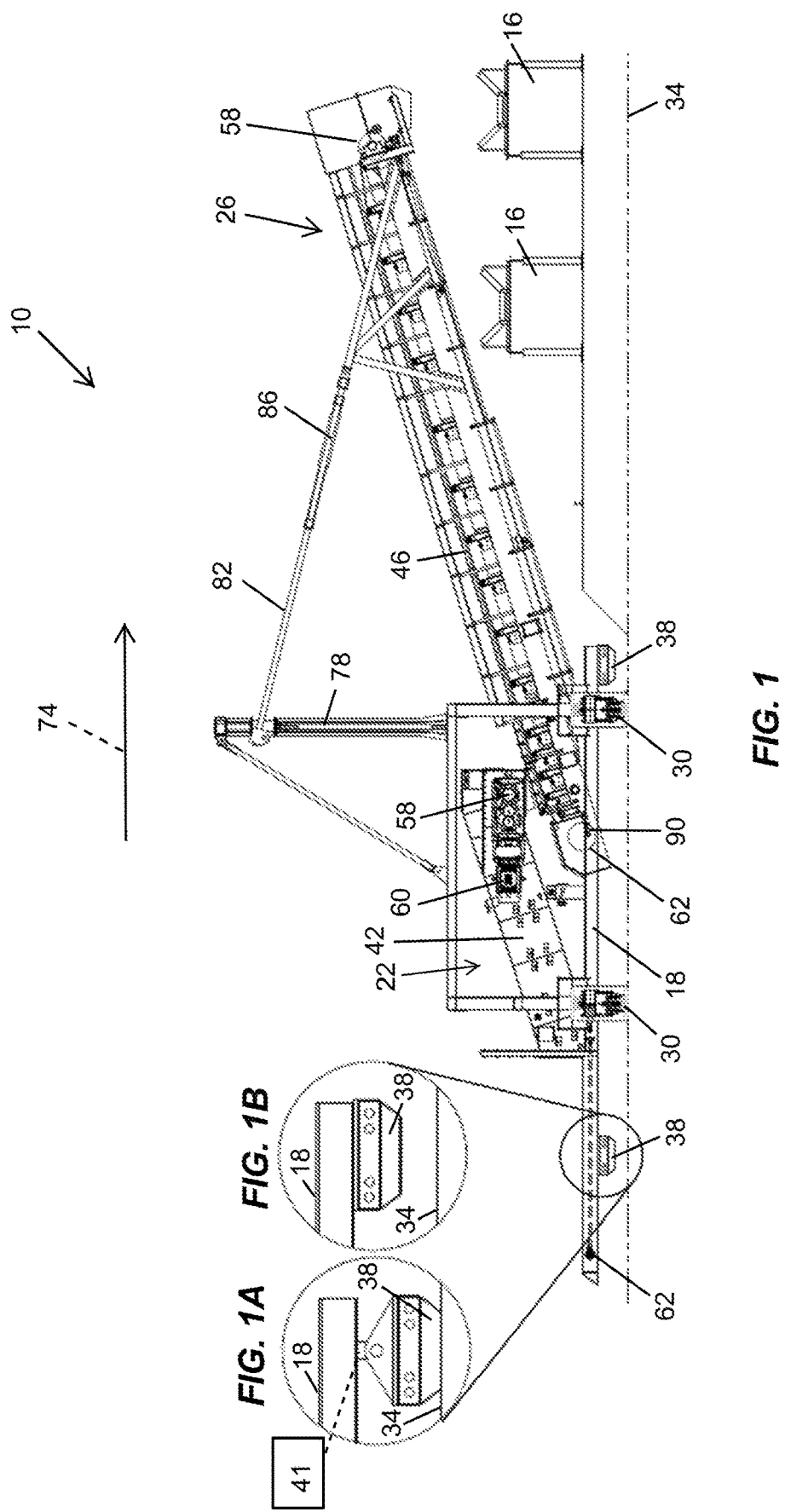
FIG. 1 is a side elevation view of a conveyor system according to one construction.
FIG. 1A is an enlarged partial view of the conveyor system of FIG. 1, illustrating a skid pad in a first position.
FIG. 1B is an enlarged partial view of the conveyor system of FIG. 1, illustrating the skid pad in a second position.
Figure 2:
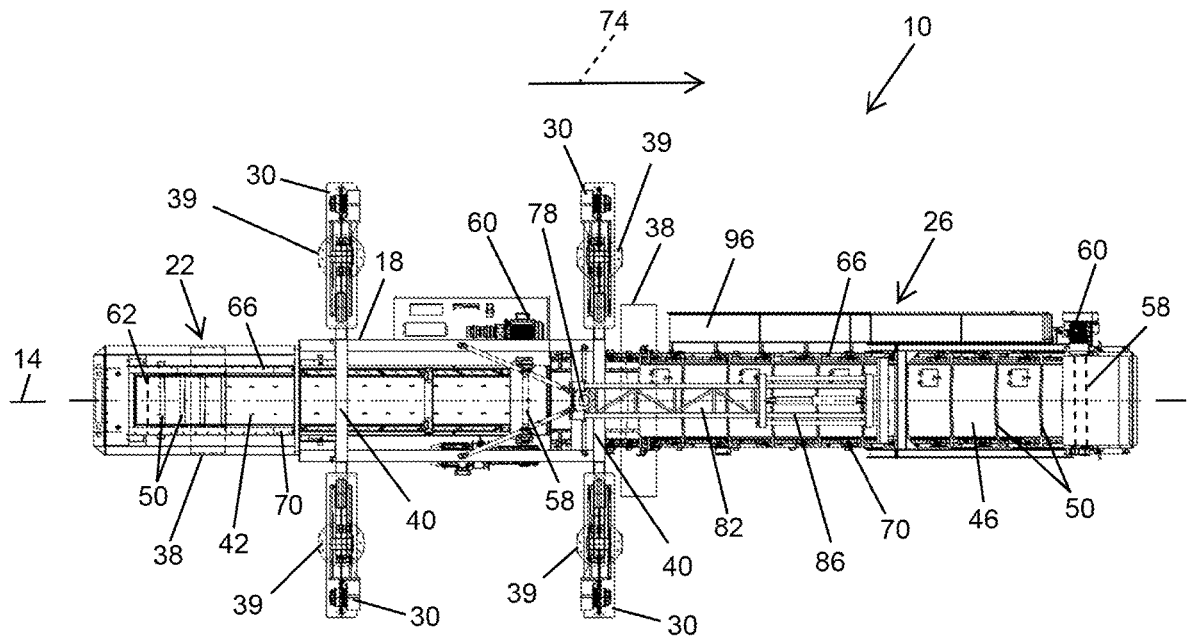
FIG. 2 is a top plan view of the conveyor system of FIG. 1, illustrating a set of drive mechanisms oriented in a first direction.
Figure 3:
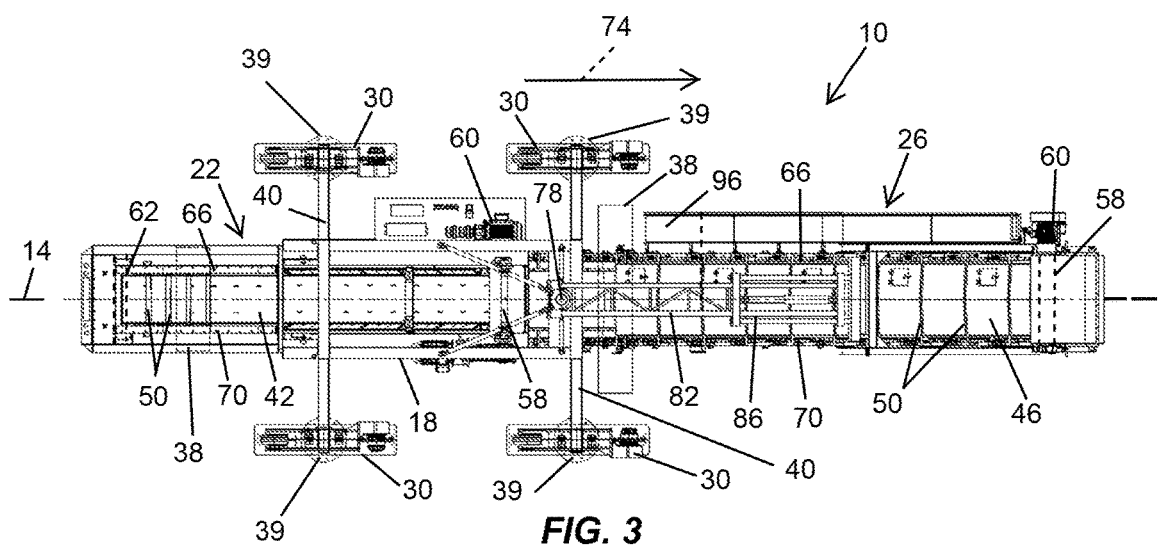
FIG. 3 is a top plan view of the conveyor system of FIG. 1, illustrating the set of drive mechanisms oriented in a second direction.

FIGS. 1-5 illustrate a conveyor system 10 used for transporting mined material (e.g., rocks, minerals, dirt, etc.) in a direction generally along a longitudinal axis 14 (FIGS. 2 and 3). In the illustrated construction, the conveyor system 10 is a mobile load-out reclaim feeder for use at port load-out facilities, although in other constructions the conveyor system 10 is used in other locations (e.g., other mining locations) to move material from one location to another. In some constructions, the conveyor system 10 is included as part of a mining machine, such as, for example, an armored face conveyor or a mobile sizer. With reference to FIG. 1, in the illustrated construction, the conveyor system 10 transports mined material to other conveyors 16 or crushing machines where the mined material is crushed to achieve a target size. The conveyor system 10 provides flexibility at port load-out facilities by maneuvering itself (i.e., via self-mobility) into a proper location and position, thereby eliminating use of external means (e.g., a dozer, other towing equipment, etc.) to tow and reposition the conveyor system 10. In addition to self-mobility, and as described further below, the conveyor system 10 also self-elevates into a number of various heights to accommodate different applications.

Figure 4:
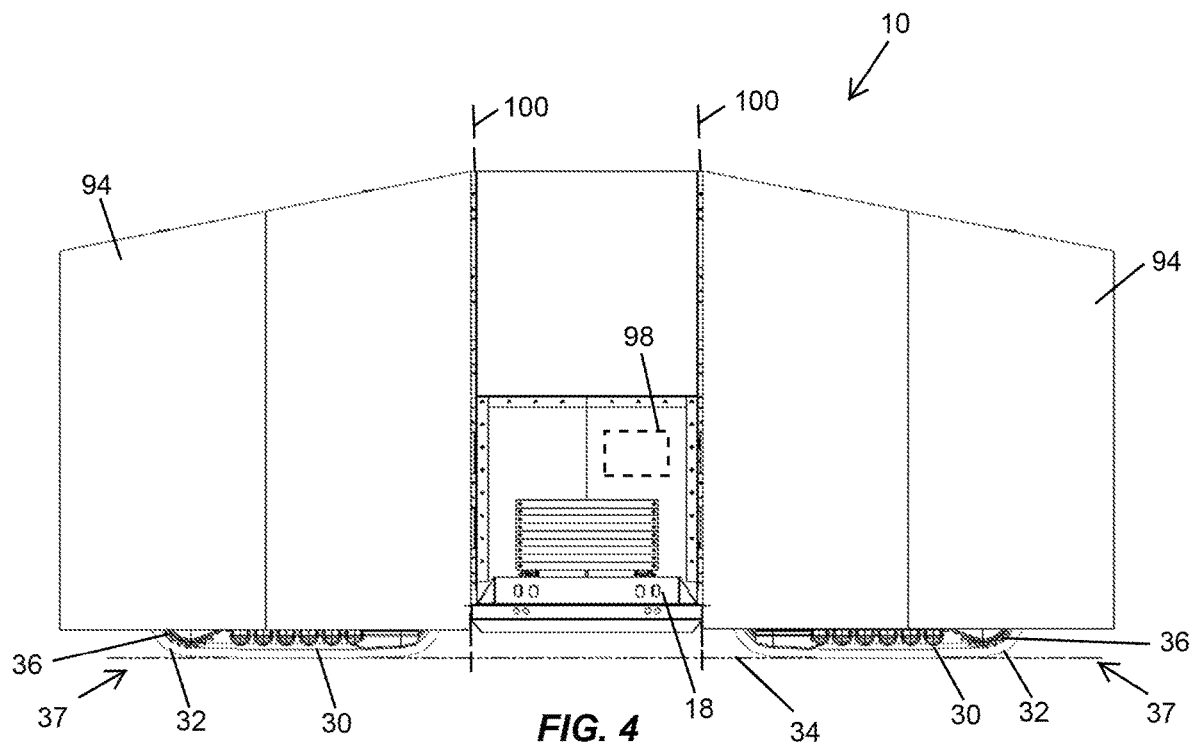
FIG. 4 is a rear elevation view the conveyor system, illustrating wing walls in an extended position.

With reference to FIGS. 1-3, the conveyor system 10 includes a frame 18, an intake structure 22 supported by the frame 18, and a discharge boom 26 extending away from the intake structure 22. The longitudinal axis 14 extends generally along a direction between the intake structure 22 and the discharge boom 26, as viewed in FIGS. 2 and 3. The conveyor system 10 further includes crawler members 30 having continuous tracks 32 (FIG. 4) that support the frame 18 on a ground surface 34 for mobility, and that each rotate about gears and/or rollers (e.g., at least one drive gear 36 as illustrated in FIG. 4 that forms a drive system 37 for movement of the continuous track 32). The conveyor system 10 also includes skid pads 38 (FIGS. 1, 1A, 1B) operable to stabilize the conveyor system 10 in a specified position relative to the ground surface 34. In other constructions, the crawler members 30 have wheels or other suitable means (e.g., without a continuous track 32) to support and maneuver the conveyor system 10.

The crawler members 30 are pivotable between a first position (FIG. 2) and a second position (FIG. 3). In the first position, the crawler members 30 are oriented transverse to the longitudinal axis 14 to allow the conveyor system 10 to move in a direction perpendicular to the longitudinal axis 14. In the second position, the crawler members 30 are oriented parallel to the longitudinal axis 14 to allow the conveyor system 10 to move in a direction along the longitudinal axis 14. The crawler members 30 are pivotable to any number of other angles (e.g., up to 90 degrees, up to 180 degrees, or greater than 180 degrees), thereby allowing the conveyor system 10 to move in any desired direction. Further, each crawler member 30 is capable of pivoting independently of the other crawler members 30, which allows the conveyor system 10 to perform a variety of different maneuvers and turns. The conveyor system 10 of the illustrated embodiment includes four crawler members 30, while in other constructions, the conveyor system 10 includes more or less than four crawler members 30 (e.g., two crawlers, six crawlers, etc.).

With continued reference to FIGS. 2 and 3, in the illustrated construction the crawler members 30 are each pivotally coupled to a supporting pivot base 39 (e.g., located above each crawler member 30). The supporting pivot bases 39 are coupled together in pairs via supporting rods 40. The crawler members 30 are each rotatable about the supporting pivot bases 39 (e.g., via drive mechanisms such as motors or other prime movers, and/or bearings, located in the support pivot bases 39 and/or on the crawler members 30 themselves). In some constructions, to maneuver the conveyor system 10 in a desired direction, the four crawler members 30 (or other number of crawler members 30) are pivoted simultaneously (e.g., 45 degrees each, or 90 degrees each) toward the desired direction, so that the entire conveyor system 10 is then able to move in the desired direction (e.g., linearly). In some constructions, the four crawler members 30 are first pivoted to the position illustrated in FIG. 2, and the conveyor system 10 is then moved laterally. The crawler members 30 are then pivoted to the position in FIG. 3, and the conveyor system 10 is moved forward or backward. In other constructions, one or more of the crawler members 30 are pivoted at an angle different from that of another of the crawler members 30 (e.g., so that the conveyor system 10 itself begins to rotate as the crawlers 30 move). Additionally, in some constructions, one or more of the continuous tracks 32 is driven faster on one of the crawler members 30 than on another of the crawler members 30. Other constructions include various other arrangements of crawler members 30 than that illustrated, as well as various other combinations of angles and movements of the crawler members 30 and the conveyor system 10.

With reference to FIGS. 1A and 1B, the skid pads 38 are coupled to the frame 18 adjacent to each crawler member 30, although other constructions include different locations for the skid pads 38. In the illustrated construction, the conveyor system 10 includes four skid pads 38, with one skid pad 38 adjacent to each corresponding crawler member 30. The skid pads 38 are movable between a retracted position (FIGS. 1 and 1B) and an extended position (FIG. 1A). In the retracted position, the conveyor system 10 is operable to maneuver relative to the ground surface 34 via the crawler members 30. In contrast, when the skid pads 38 are in the extended position, the conveyor system 10 is inhibited from moving relative to the ground surface 34. Specifically, the skid pads 38 elevate the conveyor system 10 relative to the ground surface 34 when moved from the retracted position to the extended position, thereby maintaining the conveyor system 10 in a stable position relative to the ground surface 34.

The skid pads 38 of the illustrated construction are simultaneously movable via a hydraulic fluid system 41 (illustrated schematically in FIG. 1A). In other constructions, the skid pads 38 are moved via other suitable systems (e.g., via linkages, etc.) and/or are moved independently of one another. The skid pads 38 may be made at least partially of rubber, metal, and/or any other suitable material. In some constructions, when the skids pads 38 are moved to the extended position, the crawler members 30 are raised off of the ground surface 34.

With reference to FIGS. 2 and 3, the intake structure 22 and the discharge boom 26 include first and second conveyors 42, 46, respectively. In the illustrated construction, a portion of the first conveyor 42 is inclined relative to the ground surface 34. Each of the first and second conveyors 42, 46 includes a head drive shaft 58 at one end of the conveyor 42, 46, a tail drive shaft 62 at an opposite end of the conveyor 42, 46, a first chain 66 along one side of the conveyor 42, 46, a second chain 70 along an opposite side of the conveyor 42, 46, and flights 50 coupled between the chains 66, 70. The first chain 66 and the second chain 70 are each positioned around the head drive shaft 58 and the tail drive shaft 62. The flights 50 are spaced along the conveyors 42, 46 at equal intervals to facilitate moving mined material along the conveyors 42, 46 toward, for example, the existing conveyors 16 or along a material flow direction 74 that is parallel to the longitudinal axis 14 (from the frame of reference in FIGS. 2 and 3). In other words, the material flow direction 74 is the general direction mined material travels while the conveyor system 10 is in operation.

With continued reference to FIGS. 2 and 3, the conveyor system 10 includes a pair of self-contained power units 60 that drive the head drive shafts 58 of each conveyor 42, 46. During operation, the power units 60 drive the head drive shafts 58 which, in turn, drive the chains 66, 70 and the flights 50. The tail drive shaft 62 acts as an idler. Mined material is initially loaded onto the first conveyor 42 of the intake structure 22 where the mined material is transported and directed to the second conveyor 46 of the discharge boom 26 via the flights 50. In some constructions, one or more of the power units 60 and/or drive shafts 58 also drives a compressor and a pump (not shown) to operate the hydraulic fluid system 41 of the skid pads 38.

With reference to FIGS. 1-3, the frame 18 further includes a boom mast 78 for supporting the discharge boom 26, which is cantilevered from the frame 18. The boom mast 78 is coupled to the discharge boom 26 via a connecting rod 82 and a hydraulic piston-cylinder assembly 86. The piston-cylinder assembly 86 is actuated via hydraulic fluid to raise or lower the discharge boom 26 relative to the ground surface 34. One end of the discharge boom 26 pivots about a pivot point 90 (FIG. 1) on the frame 18 while the other end is raised and lowered relative to the frame 18 and the ground surface 34 via the piston-cylinder assembly 86. In the illustrated construction, the discharge boom 26 is pivoted between a relatively horizontal or parallel position relative to the ground surface 34 to a relatively vertical or perpendicular position relative to the ground surface 34 (i.e., between 90 degrees of movement). In some constructions, the discharge boom 26 is pivoted between less than 90 degrees (e.g., up to 45 degrees, up to 60 degrees, etc.). In some constructions, one or more of the power units 60 and/or drive shafts 58 drives a compressor and pump to operate the hydraulic fluid system of the piston-cylinder assembly 86. In other constructions, the discharge boom 26 is raised and lowered relative to the ground surface 34 via other suitable systems (e.g., pulley system, mechanical jack system, etc.).

With reference to FIG. 1, in the illustrated construction, the pivot point 90 at the first end of the discharge boom 26 is disposed vertically below a second end of the intake structure 22 such that the first conveyor 42 and the second conveyor 46 partially overlap, and material drops off of the first conveyor 42 and onto the second conveyor 46 during movement along the material flow direction 74. Other constructions include different arrangements of the first conveyor 42 and the second conveyor 46 (e.g., arrangements without such an overlap).

Figure 5:
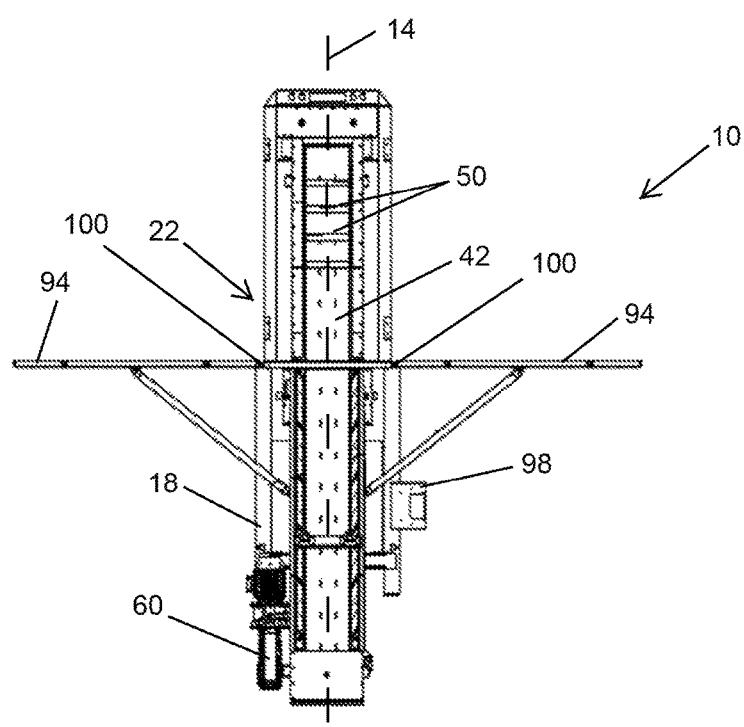
FIG. 5 is a top plan view the conveyor system, illustrating the wing walls in the extended position.

With reference to FIGS. 4 and 5, in some constructions the conveyor system 10 further includes a pair of wing walls 94 pivotably coupled to the frame 18 about pivot axes 100 that are perpendicular to the longitudinal axis 14. The wing walls 94 are pivotable between an inoperative or "closed" position and an operative or "open" position (the open position illustrated in FIGS. 4 and 5). In the closed position, the wing walls 94 are oriented substantially parallel to the longitudinal axis 14. When the wing walls 94 are in the closed position, the wing walls 94 are stored and not used during that time. In the open position (FIGS. 4 and 5), the wing walls 94 are oriented substantially perpendicular to the longitudinal axis 14. When the wing walls 94 are in the open position, the wing walls 94 contain the mined material proximate the intake structure 22 and inhibit the mined material from burying the discharge boom 26. For example, when a large pile of mined material is loaded onto the intake structure 22, the wing walls 94 act as a barrier to protect components (e.g., the drive shafts 58, operator walkways 96, etc.). Typically, the wing walls 94 are pivoted to the closed position for machine transport.

In operation, mined material is received at the intake structure 22 of the conveyor system 10. The conveyors 42, 46 transport the mined material in the material flow direction 74 from the intake structure 22 to the discharge boom 26.

Prior to the mined material being received at the intake structure 22 (e.g., piled adjacent the intake structure 22) the conveyor system 10 is first maneuvered into position relative to the port load-out facility, existing conveyor 16, or other location via the crawler members 30. For example, the conveyor system 10 is maneuvered remotely by an operator such that the operator is stationed away from the conveyor system 10. In some constructions, a control system 98 (FIG. 4) on the conveyor system 10 receives signals remotely from the operator. The signals are interpreted to maneuver the crawler members 30 of the conveyor system 10 to pivot to other orientations, to deploy the skid pads 38, to change the angle/height of the discharge boom 26, to operate the conveyors 42, 46, and/or to pivot the wing walls 94. In some constructions, maneuvering of the crawler members 30, and/or control of the skid pads 38, boom 26, conveyors 42, 46, and/or wing walls 94 is performed by an operator on the conveyor system 10 itself, rather than remotely.

Although the invention has been described in detail with reference to certain preferred constructions, variations and modifications exist within the scope and spirit of one or more independent aspects of the invention as described.

What is claimed is:

1. A conveyor system comprising:
a plurality of crawler members configured to move along a ground surface;
a frame supported by the crawler members and extending along a longitudinal axis;
a skid pad moveable relative to the frame to raise and lower the frame relative to a ground surface;
an intake structure supported by the frame, the intake structure including a first conveyor; and
a discharge boom supported by the frame, the discharge boom including a second conveyor, wherein the boom is configured to pivot 90 degrees from a horizontal position along the longitudinal axis to a vertical position relative to the longitudinal axis so as to extend vertically relative to the ground surface.

2. The conveyor system of claim 1, wherein the discharge boom includes a first end pivotally coupled to the frame and a second, opposite end spaced from the frame.

3. The conveyor system of claim 2, further comprising a boom mast coupled to the frame, and a hydraulic piston-cylinder assembly extending between the boom mast and the second end of the discharge boom.

4. The conveyor system of claim 2, wherein the intake structure includes a first end and a second, opposite end, wherein the second end of the intake structure overlaps the first end of the discharge boom, such that material moving along the first conveyor is configured to drop from the second end of the intake structure and onto the second conveyor.

5. The conveyor system of claim 1, wherein each of the first conveyor and the second conveyor includes a head drive shaft at one end of the first or second conveyor, a tail drive shaft at an opposite end of the first or second conveyor, a first chain disposed along one side of the first or second conveyor, a second chain disposed along an opposite side of the first or second conveyor, and a plurality of flights coupled between the first and second chains.

6. The conveyor system of claim 1, wherein each of the crawler members is rotatable relative to the frame.

7. The conveyor system of claim 6, wherein each of the crawler members is rotatable at least 90 degrees relative to the frame.

8. The conveyor system of claim 6, wherein the crawler members are independently rotatable relative to the frame.

9. The conveyor system of claim 1, further comprising a control system configured to receive a signal remotely from an operator, wherein the control system is configured to operate at least one of the plurality of crawler members, the skid pad, the first conveyor, or the second conveyor.

10. The conveyor system of claim 1, wherein the skid pad is movable between a retracted position and an extended position relative to the frame.

11. The conveyor system of claim 1, wherein the crawler members include at least four crawler members each having a crawler track driven by a drive system, and wherein the skid pad is disposed adjacent one of the four crawler members.

12. The conveyor system of claim 1, wherein the skid pad is a first skid pad, and further comprising a second skid pad movable relative to the frame to raise and lower the frame, wherein the plurality of crawler members are positioned between the first skid pad and the second skid pad.

13. A conveyor system comprising:
a plurality of crawler members;
a frame supported by the crawler members;
an intake structure supported by the frame, the intake structure including a first conveyor; and
a discharge boom supported by the frame, the discharge boom including a second conveyor;
wherein each of the crawler members is independently rotatable relative to the frame.

14. The conveyor system of claim 13, wherein each of the crawler members is rotatable at least 90 degrees relative to the frame.

15. The conveyor system of claim 13, wherein the discharge boom includes a first end pivotally coupled to the frame, and a second opposite end spaced from the frame.

16. The conveyor system of claim 15, further comprising a boom mast coupled to the frame, and a hydraulic piston-cylinder assembly extending between the boom mast and the second end of the discharge boom.

17. The conveyor system of claim 15, wherein the intake structure includes a first end and a second, opposite end, wherein the discharge boom includes a first end and a second, opposite end, and wherein the second end of the intake structure overlaps the first end of the discharge boom, such that material moving along the first conveyor is configured to drop from the second end of the intake structure and onto the second conveyor.

18. The conveyor system of claim 15, wherein the conveyor system is configured to move along a ground surface, and wherein the discharge boom is pivotal at least 90 degrees relative to the frame.

19. The conveyor system of claim 13, wherein each of the first conveyor and the second conveyor includes a head drive shaft at one end of the first or second conveyor, a tail drive shaft at an opposite end of the first or second conveyor, a first chain disposed along one side of the first or second conveyor, a second chain disposed along an opposite side of the first or second conveyor, and a plurality of flights coupled between the first and second chains.

\* \* \* \* \*